United States Patent
Antonetti et al.

(10) Patent No.: US 7,954,599 B2
(45) Date of Patent: Jun. 7, 2011

(54) GEAR MECHANISM WITH CONTROLLED DEVICE FOR GENERATING A RAREFIED ATMOSPHERE

(75) Inventors: Alain Antonetti, Fegersheim (FR); Etienne Lauffenburger, Benfeld (FR); Peter Leoni, Blaesheim (FR); Patrick Loos, Herrlisheim (FR)

(73) Assignee: Flender Graffenstaden, Illkirch (FR)

( * ) Notice: Subject to any disclaimer, the term of this patent is extended or adjusted under 35 U.S.C. 154(b) by 975 days.

(21) Appl. No.: 10/506,195

(22) PCT Filed: Feb. 28, 2003

(86) PCT No.: PCT/FR03/00664
§ 371 (c)(1),
(2), (4) Date: Oct. 20, 2004

(87) PCT Pub. No.: WO03/074903
PCT Pub. Date: Sep. 12, 2003

(65) Prior Publication Data
US 2005/0139427 A1    Jun. 30, 2005

(30) Foreign Application Priority Data
Mar. 1, 2002 (FR) ..................... 02 02656

(51) Int. Cl.
*F16H 57/04* (2010.01)
(52) U.S. Cl. ......... 184/6.12; 184/6; 184/6.11; 184/6.28; 184/1.5; 184/103.1
(58) Field of Classification Search .......... 184/6.12, 184/6, 6.11, 6.28, 6.5, 1.5, 103.1, 103.2, 184/65, 14
See application file for complete search history.

(56) References Cited

U.S. PATENT DOCUMENTS

| | | | | |
|---|---|---|---|---|
| 2,440,980 A | * | 5/1948 | Sheppard | 415/110 |
| 3,489,034 A | * | 1/1970 | Moore | 74/606 R |
| 4,046,222 A | * | 9/1977 | Skrivanek et al. | 184/6.11 |
| 4,105,092 A | * | 8/1978 | Zeidler et al. | 184/6.4 |
| 4,105,093 A | * | 8/1978 | Dickinson | 184/6.11 |
| 4,390,082 A | * | 6/1983 | Swearingen | 184/6.4 |
| 4,848,518 A | | 7/1989 | Ornberg et al. | |
| 5,299,657 A | * | 4/1994 | Hikes | 184/6.22 |
| 5,319,920 A | * | 6/1994 | Taylor | 60/39.08 |
| 5,341,900 A | * | 8/1994 | Hikes | 184/6.12 |
| 5,429,208 A | * | 7/1995 | Largillier et al. | 184/6.11 |
| 5,735,676 A | * | 4/1998 | Loos | 417/407 |
| 5,950,501 A | * | 9/1999 | Deeg et al. | 74/606 R |

FOREIGN PATENT DOCUMENTS

| | | |
|---|---|---|
| EP | 0 739 463 | 10/1996 |
| JP | 04031612 A * | 2/1992 |

\* cited by examiner

*Primary Examiner* — Robert A Siconolfi
*Assistant Examiner* — James K Hsiao
(74) *Attorney, Agent, or Firm* — Oliff & Berridge, PLC

(57) ABSTRACT

A gear mechanism comprising at least two toothed parts accommodated in a casing, a storage tank that stores oil to be injected into each meshing zone of the at least two tooth parts, a first receptacle built into the casing for receiving oil, a second receptacle that communicates with the first receptacle into which the oil can flow from the first receptacle, the second receptacle in turn communicating with the storage tank. Oil is conveyed from the storage tank to each meshing zone at a pressure greater than the pressure prevailing in the casing, internal pressure in the casing is reduced, and oil is drained to the storage tank. The first and second receptacles have a substantially identical pressure, while the storage tank is generally maintained at atmospheric pressure. The gear mechanism operates at atmospheric pressure if the gear mechanism fails to reduce internal pressure in the casing.

11 Claims, 1 Drawing Sheet

GEAR MECHANISM WITH CONTROLLED DEVICE FOR GENERATING A RAREFIED ATMOSPHERE

BACKGROUND OF THE INVENTION

The present invention relates to a gear mechanism of the speed-increasing or speed-reducing type, intended for example to drive, or be driven by, turbine engines.

These mechanisms, which can also be viewed as fixed-ratio transmissions, operate at high speed and are responsible for power losses that manufacturers seek to diminish by working with the various known factors that cause them. Without particular treatment, these losses represent approximately 1% of the total power, and are hence far from negligible for high-power engines.

In the course of research into this problem, the manufacturers have observed that 90% of the losses are generated in the total absence of load, i.e. when the engine is idling. They are due mainly to control of the amount of lubricant and coolant injected between the gear teeth, to gas turbulence created when the toothed parts operate at high speed, and to friction in the bearings supporting the rotating shafts to which said toothed parts are attached.

The traditional design of these mechanisms is as follows: the toothed parts are accommodated in closed casings to which the bearings supporting the rotating shafts of said toothed parts are joined. The casings thus delimit a closed, protected space, in which the lubricating/cooling oil injected into the gears is recovered. The oil is then collected in an external storage tank before being reinjected after cooling into the meshing zone of the teeth of the toothed parts.

One of the most effective ways to reduce losses, particularly that described in U.S. Pat. No. 3,489,034, consists of creating a partial vacuum inside the casing. In this case, the losses due to turbulence caused by the high peripheral speeds of the teeth are considerably reduced. Creation of a partial vacuum thus eliminates about half the total loss, and this can be decreased still further by altering the flowrate of the lubricating/cooling fluid past the bearings, etc.

As an alternative to creating a vacuum, and to obtain a similar result, it has also been proposed that a low-density gas of the helium type be injected into the casing, replacing the air and thus reducing the density of the gas phase in the casing.

The pressure reduction obviously affects the overall design of the mechanism. Thus, the lubricating/cooling fluid recirculation system is obviously affected by the pressure value inside it. The substantial drop in gas pressure demands consideration of the behavior of the engine if the system creating the pressure should break down, and the repercussions of a possible malfunction in the recirculation system.

These problems are what the mechanism on which the present invention is based sets out to resolve. In particular, the existence of a low gas pressure requires mechanical means to be established to assist in the transfer of lubricating/cooling fluid (usually oil) from the casing to the oil storage tank. In fact, the oil is usually transferred by means of a pump, the operation of which can however be impeded by cavitation phenomena because of the pressure inside the casing.

The chief goal of the present invention is to propose a configuration avoiding all cavitation problems when oil is pumped from the casing into the oil reservoir. Very generally, the invention consists of a control device to create a rarefied atmosphere in a gear mechanism.

According to a second related goal, the mechanism according to the invention must continue to operate, at least temporarily, even if the system creating the low pressure and/or the evacuation means fails.

These goals, and others that will emerge from reading the detailed description of the invention, are achieved by the gear mechanism according to the invention which is more specifically composed of at least two toothed parts accommodated in a casing, each part being attached to a rotating shaft in bearings joined to the casing; of a storage tank for lubricating/cooling oil to be injected into each meshing zone of the toothed parts; of means for conveying the oil from said tank to the meshing zones in order to inject it there at a pressure greater than the pressure prevailing in the casing; of means for reducing the pressure in the casing; and of means for transferring the oil to the storage tank.

SUMMARY OF THE INVENTION

According to the invention, this invention is principally characterized by having a first receptacle built into the casing for recovering the lubricating/cooling oil, which communicates with a second receptacle into which the oil can flow from the first receptacle, with the second receptacle in its turn communicating with the storage tank, said receptacles and the tank being designed so that the oil can spill into them successively by gravity flow, with an identical pressure prevailing in the receptacles while the tank is always at atmospheric pressure, said transfer means being disposed downstream of the second receptacle and being controlled by the oil level therein, means also being provided so that, if the pressure reducing and/or evacuation means should fail, operation of the mechanism at atmospheric pressure is ensured.

The major contribution of the invention resides in the existence of the second receptacle, which handles the oil recirculation system in a very special way, and provides a specific approach to the problem of alternative operation of the mechanism when the means for establishing the reduced pressure and/or the transfer means do not operate correctly for whatever reason. Indeed, the second receptacle may be equated with a holding tank enabling pressure to be regulated between two parts of the recirculation system operating at low pressure and at atmospheric pressure, respectively.

The particular arrangement of the various elements in the recirculation system, namely the two receptacles and the storage tank, is also essential in that it allows the oil to flow by gravity, facilitating operation in all working situations.

Control of the transfer means by the oil level enables them to be used only when the conditions are appropriate to their operation.

Preferably, the second receptacle consists of an intermediate oil reservoir distinct from the casing to which it is connected by a pipe, said reservoir being located at least partially under the casing so that, in operation, the oil level never reaches the bottom of the first receptacle.

The physical separation between the casing and this second receptacle has a considerable advantage: it enables a system operating at low pressure to be retrofitted to a traditional gear mechanism, i.e. one operating at atmospheric pressure. The various components needed for retrofitting a low-pressure system can be provided outside the casing and outside the storage tank, as will appear more clearly from the detailed description hereinbelow.

Alternatively, it is of course also possible to build the second receptacle into the casing.

According to a classical configuration, the first receptacle is simply constituted by the bottom of said casing.

The lubricating/cooling oil recirculation system has, as referred to above, transfer means to the second receptacle. These means consist in particular of a power pump assembly whose motor is controlled by a selector controlled by the oil level in the second receptacle, between two limits of said level, with a sensor marking the lower limit that enables said power pump assembly to be stopped when the inlet pressure of the oil into the pump falls to a level that could create cavitation phenomena, while if the upper oil limit is exceeded, a valve draining the second receptacle is opened.

Between these two operating limits, the drainage pump adapts its pumping capacity to the actual oil level in the intermediate reservoir.

When the oil exceeds the upper limit, this means in principle that said transfer means are no longer functional. In this case, opening of the drain valve allows the oil to flow by gravity at a sufficient rate to ensure continued operation of the system. The means for establishing the low pressure are, in this case, cut off so that the system returns to operation at atmospheric pressure.

Conversely, when the oil level reaches the lower limit, the transfer pump stops operating until the oil level goes back above said lower limit, to prevent any damage from possible cavitation.

According to one option, the selector controlling the motor of the power pump assembly is a variable-frequency drive controlled by a converter that converts the analog measurement of the oil level into an electrical magnitude exploitable by the selector.

The lower level corresponds for example to a given current, which progresses linearly up to an upper current corresponding to the top level.

Preferably, the drain valve of the second receptacle is located in the vicinity of its bottom, and opens when the pressure differential applied is on the order of 1 bar.

Opening of this valve at a given pressure corresponds in fact to a passive safety feature: there is no loop detection of a magnitude reflecting the oil level, but simply an on-off mechanism which opens past a certain level. Thus, if the transfer means of the intermediate reservoir fail, the oil level increases gradually in said reservoir until the pressure differential applied to the valve located in the lower part is approximately 1 bar. This causes this valve to open and oil to flow.

In the case where the means for establishing low pressure fail, the pressure rises back to atmospheric pressure inside said intermediate reservoir, and the valve also opens.

Whatever the type of failure, the mechanism according to the invention continues to operate normally at atmospheric pressure.

To keep to pressure values enabling a pump to operate normally, without being perturbed by cavitation phenomena, the sensor marking the lower limit below which the power pump assembly stops is located at a level in the second receptacle that corresponds essentially to a minimum limit inlet pressure in the transfer pump.

This pressure of course corresponds to addition of the pressure generated by the oil height and the gas pressure prevailing above the oil level in the intermediate reservoir.

According to the invention, when the means for reducing gas pressure and/or evacuation pressure of the second receptacle stop, a venting valve opens, causing the pressure in the enclosures affected by these means to rise to atmospheric pressure. These means, whose function is to reduce the pressure in part of the system between 0.1 and 0.2 bar, are preferably comprised of a traditional power pump assembly, whose pump is connected to part of the system in which it creates a partial vacuum.

The last part of the hydraulic oil recirculation system is the part connecting the storage tank to the injection nozzles, in the vicinity of the gears. This part comprises means for moving oil from the tank to the nozzles, specifically including a pump for injecting oil into the gear mechanism.

These features, locations, arrangements, and operating modes of the totality of the elements in the system described hereinabove enable the system to operate both at atmospheric pressure and, at least in part of the system, at low pressure. The goal of enabling a low-pressure system to be retrofitted to a traditional system operating at atmospheric pressure is also achieved by the invention.

DESCRIPTION OF EMBODIMENTS

Figure 1:
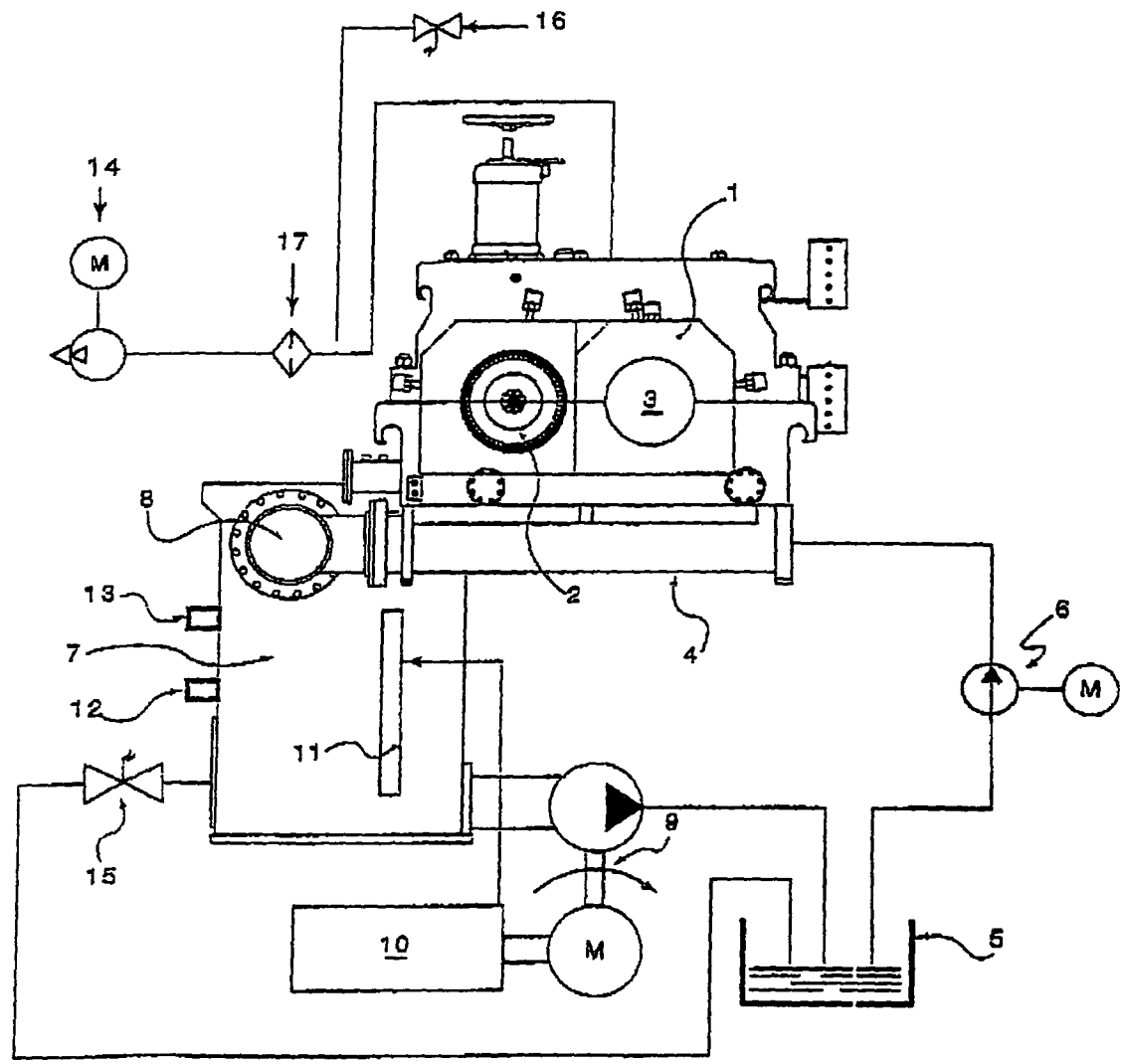
FIG. 1 is a schematic view of a mechanism according to this disclosure.

This will be described in greater detail with reference to the single attached FIGURE, which is a schematic view of the mechanism having the features of the invention.

This mechanism consists of a casing (1) containing the toothed parts joined to rotating shafts, one (2) of which is visible because it protrudes from the casing (1) on its side visible in the FIGURE, while the other protrudes from the opposite side. Its location however corresponds to the circular surface (3), which represents a possible access to the rotational bearing joined to casing (1).

The bottom (4) of casing (1) is the first receptacle, into which spills the oil injected into the gears. This oil, coming from storage tank (5), is pumped by pump (6) in the direction of injection nozzles located in the vicinity of the meshing zones of the teeth of the toothed parts and of devices for supplying the bearings. The oil collects on the bottom (4) of casing (1) and then runs to an intermediate reservoir (7) through a pipe (8) located in the vicinity of said bottom (4). In order for the oil to flow by gravity, at least the part of the intermediate reservoir (7) that stores the oil is located below bottom (4).

A power pump assembly (9) then, under certain conditions, pumps the oil accumulating in reservoir (7) to the main storage tank (5). The motor of power pump assembly (9) is controlled by a variable-frequency drive (10) itself controlled by a converter (11) that converts the analog level of the oil in the intermediate reservoir (7) into an electrical magnitude proportional to the level, for example an electric current. However, the motor is powered only between two oil-level threshold values, shown in the FIGURE by lower indicator (12) and upper indicator (13).

When the oil level goes below lower limit (12), activity of the power pump assembly (9) is stopped, to prevent any risk of malfunction due for example to cavitation phenomena in the pump. These phenomena may occur during operation under vacuum, i.e. when the vacuum pump of the power pump assembly (14) is activated, creating a partial vacuum (between 0.1 and 0.2 bar) both in the casing (1) and in the intermediate reservoir (7). In this case, the pump inlet pressure may be too low if the oil level is no greater than a lower limit, as the pressure threshold is calculated from the pressure due to the oil level and to the gas pressure.

When, on the other hand, the oil level rises in uncontrolled fashion and reaches threshold (13), the pressure in the intermediate reservoir (7) is sufficient to open a valve (15) that, by gravity flow, gives access to main storage tank (5).

This occurs in particular if the power pump assembly (9) fails and the oil stored in reservoir (7) is no longer evacuated thereby. In this case, the level rises until it reaches upper level (13), which causes valve (15) to open. The operation of the mechanism according to the invention is not disrupted and continues despite said failure, thanks to the gravity flow of the oil into tank (5).

This operation in fact continues at atmospheric pressure because, if the power pump assembly (9) fails, the valve (16) for venting the spaces under vacuum to atmosphere opens.

Likewise, if the vacuum pump of the power pump assembly (14) fails, this same valve (16) opens, and the mechanism continues to operate at atmospheric pressure. In practice, the pipe connecting the vacuum pump of the power pump assembly (14) to the casing (1) is equipped with an air/oil separator (17) enabling oil to be recovered in intermediate reservoir (7).

If the vacuum pump on the one hand and the evacuation pump of the power pump assembly (9) on the other hand fail simultaneously, for example due to a power outage, the venting valve (16) on the one hand and the drain valve on the other hand both open, enabling operation in atmospheric mode to continue.

The configuration example depicted in FIG. 1 should not be deemed as limiting the invention, which on the contrary embraces all variants of shape and configuration that are within the reach of the individual skilled in the art.

The invention claimed is:

1. A gear mechanism comprising:
    at least two toothed parts accommodated in a casing, each of the at least two toothed parts being attached to a rotating shaft in bearings joined to the casing;
    a storage tank that stores oil to be injected into each meshing zone of the at least two toothed parts;
    means for conveying the oil from the storage tank to each meshing zone to inject the oil into each meshing zone at a pressure greater than the pressure prevailing in the casing;
    means for reducing an internal pressure in the casing to a pressure below atmospheric pressure; and
    means for draining the oil to the storage tank, the draining means including:
        a first receptacle built into the casing for recovering the oil;
        a second receptacle that communicates with the first receptacle via a communication means into which the oil can flow from the first receptacle, the second receptacle in turn communicating with the storage tank; and
        a transfer means that is a power pump assembly controlled by an oil level in the second receptacle disposed downstream of the second receptacle and upstream of the storage tank,
    wherein the first and second receptacles and the storage tank are configured so that the oil can flow into them successively by gravity flow, with a substantially identical pressure prevailing in the first and second receptacles while the storage tank is generally maintained at atmospheric pressure, and
    means for operating the mechanism at atmospheric pressure is provided so that, if the means for reducing internal pressure in the casing fails, operation of the mechanism at atmospheric pressure is ensured.

2. The gear mechanism according to claim 1, wherein the second receptacle comprises an intermediate oil reservoir distinct from the casing to which the second receptacle is connected by a pipe, the intermediate oil reservoir being located relative to the casing so that the oil level never reaches a bottom of the first receptacle.

3. The gear mechanism according to claim 1, wherein the first receptacle is comprised of a bottom of the casing.

4. The gear mechanism according to claim 1, wherein the power pump assembly has a motor that is controlled by a selector controlled by the oil level in the second receptacle, between two limits of the level, with a sensor marking a lower limit that enables the power pump assembly to be stopped when an inlet pressure of the oil into the power pump assembly falls to a level that could create cavitation phenomena, and if an upper limit is exceeded, a valve that drains the second receptacle is opened.

5. The gear mechanism according to claim 4, wherein the selector controlling the motor of the power pump assembly is a variable-frequency drive controlled by a converter that converts an analog measurement of the oil level into an electrical magnitude exploitable by the selector.

6. The gear mechanism according to claim 4, wherein the drain valve of the second receptacle is located in the vicinity of a bottom of the second receptacle, and the drain valve opens when a pressure differential applied to the drain valve is on the order of 1 bar.

7. The gear mechanism according to claim 4, wherein the sensor marking the lower limit below which the power pump assembly is stopped is located at a level in the second receptacle that corresponds essentially to a minimum limit inlet pressure in the power pump assembly.

8. The gear mechanism according to claim 1, wherein, when the means for reducing internal pressure in the casing stops operating, a venting valve opens causing the pressure in the mechanism to rise to atmospheric pressure.

9. The gear mechanism according to claim 1, wherein the reducing means reduce the pressure in the casing to a valve in the range of 0.1 to 0.2 bar.

10. The gear mechanism according to claim 1, wherein the reducing means comprises a power pump assembly that establishes a partial vacuum in the casing.

11. The gear mechanism according to claim 1, wherein the conveying means comprise a pump that enables the oil to be injected into each meshing zone.

* * * * *